(12) United States Patent
Goodman

(10) Patent No.: US 7,527,549 B1
(45) Date of Patent: May 5, 2009

(54) SHRIMP PEELING, DEVEINING AND HEAD REMOVAL TOOL

(76) Inventor: Danny Goodman, 102 Brigantine Dunmore Rd., Midway, GA (US) 31320

( * ) Notice: Subject to any disclaimer, the term of this patent is extended or adjusted under 35 U.S.C. 154(b) by 0 days.

(21) Appl. No.: 11/895,580

(22) Filed: Aug. 27, 2007

(51) Int. Cl.
*A22C 29/02* (2006.01)

(52) U.S. Cl. .......................................... 452/6; 452/102

(58) Field of Classification Search ................ 452/1–6, 452/17, 102–105
See application file for complete search history.

(56) References Cited

U.S. PATENT DOCUMENTS

| 411,797 | A |  | 10/1889 | Farrell |  |
|---|---|---|---|---|---|
| 2,647,278 | A |  | 8/1953 | Weinberger |  |
| D175,744 | S |  | 10/1955 | Sayers |  |
| 2,819,487 | A |  | 1/1958 | Joseph |  |
| 2,832,987 | A |  | 5/1958 | Di Camillo |  |
| 3,126,576 | A |  | 3/1964 | Johannesen |  |
| 3,777,333 | A | * | 12/1973 | Adams | 452/3 |
| D376,963 | S |  | 12/1996 | Davis |  |
| 6,817,937 | B1 | * | 11/2004 | Merritt | 452/103 |
| 6,926,599 | B2 | * | 8/2005 | Holcomb et al. | 452/102 |
| 7,198,562 | B2 | * | 4/2007 | Whetstone et al. | 452/6 |

* cited by examiner

*Primary Examiner*—David J Parsley
(74) *Attorney, Agent, or Firm*—Rodgers & Rodgers

(57) ABSTRACT

A shrimp peeling, deveining and head removal tool including a pair of handles pivoted together and urged apart by a compression spring, an upper blade attached to lower handle and a lower blade pivoted to both handles with the ends of the blades of substantially of the same configuration and disposed in close proximity one within the other when the handles are compressed, and a pair of tines extending, respectively, from the upper handle and the upper blade and being in contact substantially the entire length thereof when the handles are not compressed.

4 Claims, 2 Drawing Sheets

SHRIMP PEELING, DEVEINING AND HEAD REMOVAL TOOL

BACKGROUND OF THE INVENTION

This invention is for a shrimp peeling, deveining and head removal tool. Many known tools require a two-step process by which the head is separated first by hand from the shrimp body and then a second operation is undertaken to remove the vein across the shrimp's back while simultaneously removing the shrimp shell. Other shrimp hand tools involve a three-step process to first remove the head and then undertaking a second step of manually manipulating the tool to remove the shell and, following this, scraping the vein away from the shrimp body. These tools tend to be awkward and time-consuming to use.

BRIEF SUMMARY OF THE INVENTION

By this invention, a shrimp peeling, deveining and head removal tool is provided and includes upper and lower handles pivotally interconnected and urged apart by means of a compression spring with an upper blade attached to the lower handle and a lower blade pivoted to both the upper and lower handles such that when the handles are squeezed together the blades move into a close overlapping relation to cause severance of the shrimp head. A pair of elongated tines are attached, respectively, to the upper handle and to the outer edge portion of the upper blade and initially are disposed in a contacting relation. When the upper and lower handles are compressed, the tines separate resulting in removal of the shrimp shell and vein from the shrimp body while simultaneously severing the shrimp head.

DETAILED DESCRIPTION OF THE INVENTION

Figure 1:
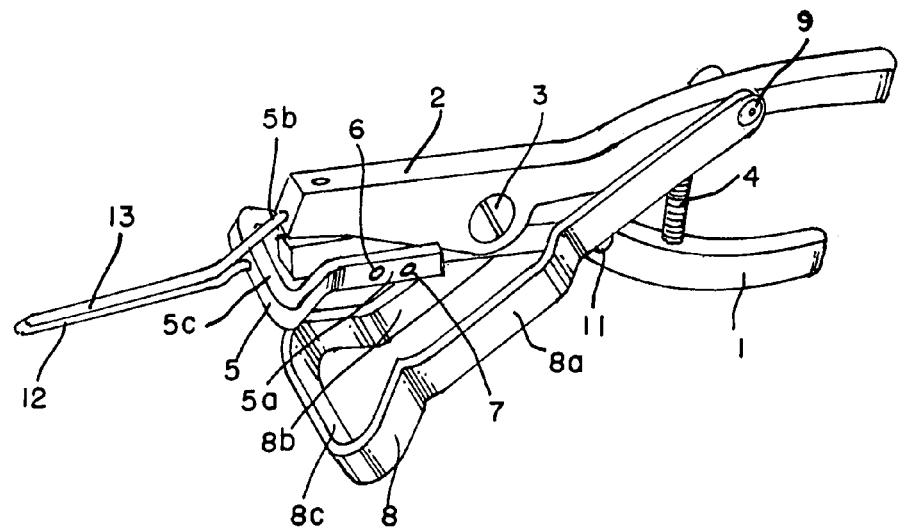
FIG. 1 is a perspective view of a shrimp peeling, deveining and head removal tool according to this invention.

In the drawings and with particular reference to FIG. 1, the numerals 1 and 2 identify the lower and upper handles of the tool, respectively, which are pivotally interconnected by means of bolt 3 arrangement. Lower handle 1 and upper handle 2 are urged apart by compression spring 4.

For the purpose of removing the shrimp head, upper blade 5 is provided and includes parallel extensions 5a and 5b and enlarged head portion 5c. Upper blade 5 is attached to lower handle 1 on one side by means of screws 6 and 7 which interconnect parallel extension 5a and lower handle 1. Although not shown in the drawings, identical connector means is emphasized with respect to parallel extension 5b and lower handle 1. To complete the head removal device, lower blade 8 is provided and includes offset side extensions 8a and 8b and enlarged head portion 8c. The free ends of side extensions 8a and 8b are pivotally connected to upper handle 2 by means of pivot pin 9. In addition, side extensions 8a and 8b are pivotally connected to lower handle 1 at the approximate midpoints by means of pivot pin 10 which extends through tabs 11 which extend downwardly from each extension 8a and 8b.

For the purpose of peeling and deveining the shrimp, elongated tines 12 and 13 are provided. More specifically, tine 12 is generally elongated in shape and is attached at one end to enlarged head portion 5c. Tine 13 is offset in configuration and is attached to the associated end of upper handle 2. When lower handle 1 and upper handle 2 are not compressed, the operating portions of tines 12 and 13 are substantially coextensive and in a contacting relationship.

Figure 2:
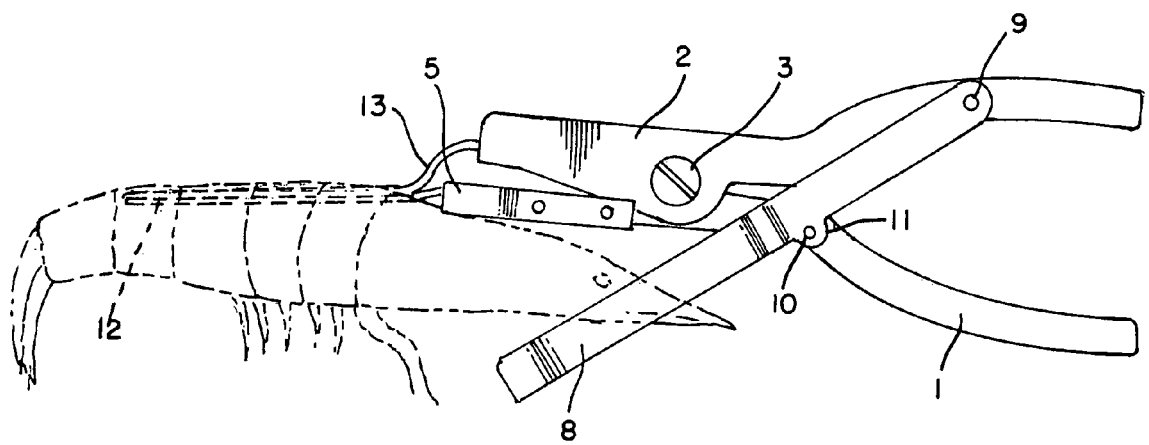
FIGS. 2, 3 and 4 depict the detailed sequential operation of the tool.
Figure 3:
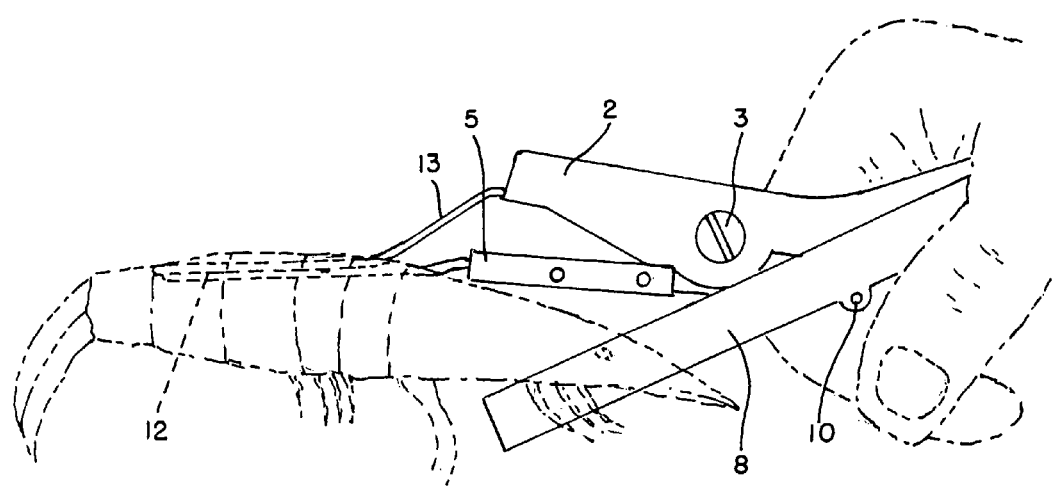

In operation, initially in order to peel and devein the shrimp and, as shown in FIG. 2, tines 12 and 13 are slipped under the shrimp shell and under the shrimp vein generally disposed along the back of the shrimp adjacent the inside of the shrimp shell. Then, lower handle 1 and upper handle 2 are squeezed together which causes tines 12 and 13 to separate with tine 13 applying upward pressure on the shell and tine 12 applying downward pressure on the shrimp body. The pressure causes the shell to split along the bottom of the shrimp at the leg area. This operation effectively lifts the shrimp shell and vein away from the shrimp body except for the portion of the shrimp body immediately adjacent the tail. Because the shrimp shell in the area of the tail is quite tough and difficult to split open, simultaneously with the manipulation of the tool, the user simply squeezes the last joint of the shrimp just before the tail with the free hand in order to completely separate and force the shrimp body from the tail section. The separated shell is then discarded.

Figure 4:
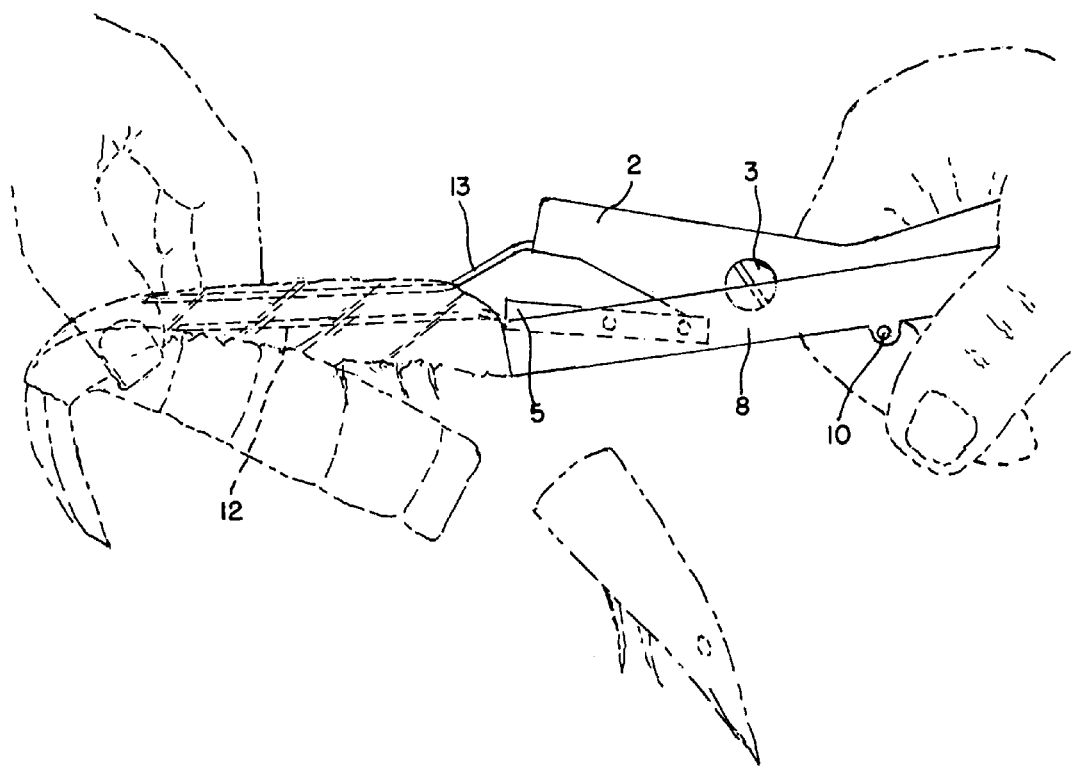

Simultaneously with the peeling and deveining operation of tines 12 and 13, the shrimp head is also removed. This is accomplished by means of the scissor action of upper blade 5 and lower blade 8 with upper blade 5 being of a similar configuration as lower blade 8, but smaller in size such that upper blade 5 fits closely inside lower blade 8 when lower handle 1 and upper handle 2 are squeezed together. When tines 12 and 13 are slipped under the shrimp shell, the shrimp head is disposed between upper blade 5 and lower blade 8. The outer surface of enlarged head portion 5c and the inner surface of enlarged head portion 8c are dimensioned to cause a scissor-like action when upper blade 5 moves inside lower blade 8 thereby causing the severance of the shrimp head, as best shown in FIG. 4.

Therefore, by this invention, a hand tool is employed to accomplish the three distinct requirements of peeling, deveining and removing the head of a shrimp in a single, quick and efficient operation.

The invention claimed is:

1. A method of peeling, deveining and removing the head of a shrimp utilizing a tool having a pair of handles, a pair of tines interconnected respectively to the ends of said handles and in contacting relation, an upper blade interconnected to said end of one of said handles, a lower blade pivoted to both of said handles, said upper blade including spaced extensions extending from said lower handle with the free ends thereof interconnected by a head portion, said lower blade including spaced side extensions pivotally connected to said upper and lower handles with the free ends thereof interconnected by an enlarged head portion, and the distance between said spaced extensions of said upper blade being less than the distance between said side extensions of said lower blade the method comprising the steps of inserting said tines under the shell of said shrimp, manipulating said handles to simultaneously open said tines to apply upward pressure on said shell by one tine and applying downward pressure on the shrimp body by the other tine and thereby remove the shrimp shell and devein the shrimp and further simultaneously maneuvering said upper blade inside said lower blade so that said head portions come together in a scissor-like movement to sever the shrimp head.

2. A method according to claim 1 wherein said shrimp is simultaneously manually squeezed adjacent the shrimp tail.

3. A method according to claim 1 wherein said upper and said lower blades are of similar configuration.

4. A method according to claim 1 wherein the operating portions of said tines are substantially coextensive.

* * * * *